United States Patent
Michels et al.

(10) Patent No.: US 6,544,412 B2
(45) Date of Patent: Apr. 8, 2003

(54) FILTER INCLUDING TEMPERATURE AND PRESSURE RESPONSIVE BYPASS

(75) Inventors: Larry Dean Michels, Olney, IL (US); John D. Gaither, West Salem, IL (US)

(73) Assignee: Champion Laboratories, Inc., Albion, IL (US)

( * ) Notice: Subject to any disclaimer, the term of this patent is extended or adjusted under 35 U.S.C. 154(b) by 0 days.

(21) Appl. No.: 10/045,573

(22) Filed: Oct. 23, 2001

(65) Prior Publication Data

US 2002/0139731 A1 Oct. 3, 2002

Related U.S. Application Data

(63) Continuation-in-part of application No. 09/820,267, filed on Mar. 28, 2001.

(51) Int. Cl.$^7$ .............................................. B01D 35/147
(52) U.S. Cl. ...................... 210/130; 210/149; 210/440; 210/137
(58) Field of Search .......................... 210/97, 110, 130, 210/131, 132, 133, 440, 443, 168, 137, DIG. 17, 416.5, 149; 123/196 A; 137/115.13, 74

(56) References Cited

U.S. PATENT DOCUMENTS

| | | |
|---|---|---|
| 3,262,567 A | 7/1966 | Pall et al. |
| 3,722,683 A | 3/1973 | Shaltis et al. |
| 3,822,787 A | 7/1974 | Shaltis et al. |
| 4,075,097 A | 2/1978 | Paul |
| 4,075,098 A | 2/1978 | Paul et al. |
| 4,144,169 A | 3/1979 | Grueschow |
| 4,388,196 A * | 6/1983 | Lucia |
| 4,400,864 A | 8/1983 | Peyton et al. |
| 4,878,536 A | 11/1989 | Stenlund |
| 4,885,082 A | 12/1989 | Cantoni |
| 4,935,127 A | 6/1990 | Lowsky et al. |
| 5,019,251 A | 5/1991 | Sundholm |
| 5,256,280 A | 10/1993 | Anderly et al. |
| 5,759,351 A | 6/1998 | Takahara et al. |
| 6,096,199 A * | 8/2000 | Covington |

* cited by examiner

*Primary Examiner*—Joseph Drodge
*Assistant Examiner*—Terry K. Cecil
(74) *Attorney, Agent, or Firm*—Olson & Hierl, Ltd.

(57) ABSTRACT

A thermal sensitive material 61 is disposed between a spring valve 60 and an end cap 50 of an oil filter (FIG. 1). Upon reaching a predetermined pressure, e.g. when the media of the oil filter becomes clogged, an opening 52 in the end cap opens to allow the oil to bypass the filter media. However, the thermal sensitive material precludes bypass flow through the end cap (e.g. during initial operation of the engine when a pressure surge may occur) until a predetermined oil temperature is attained.

19 Claims, 3 Drawing Sheets

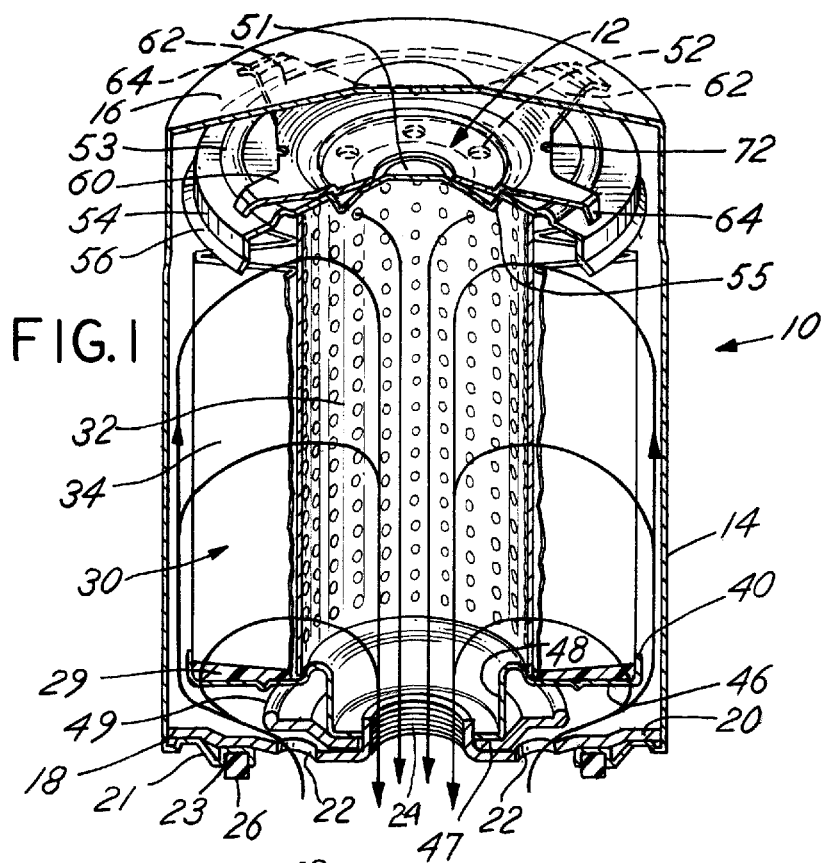
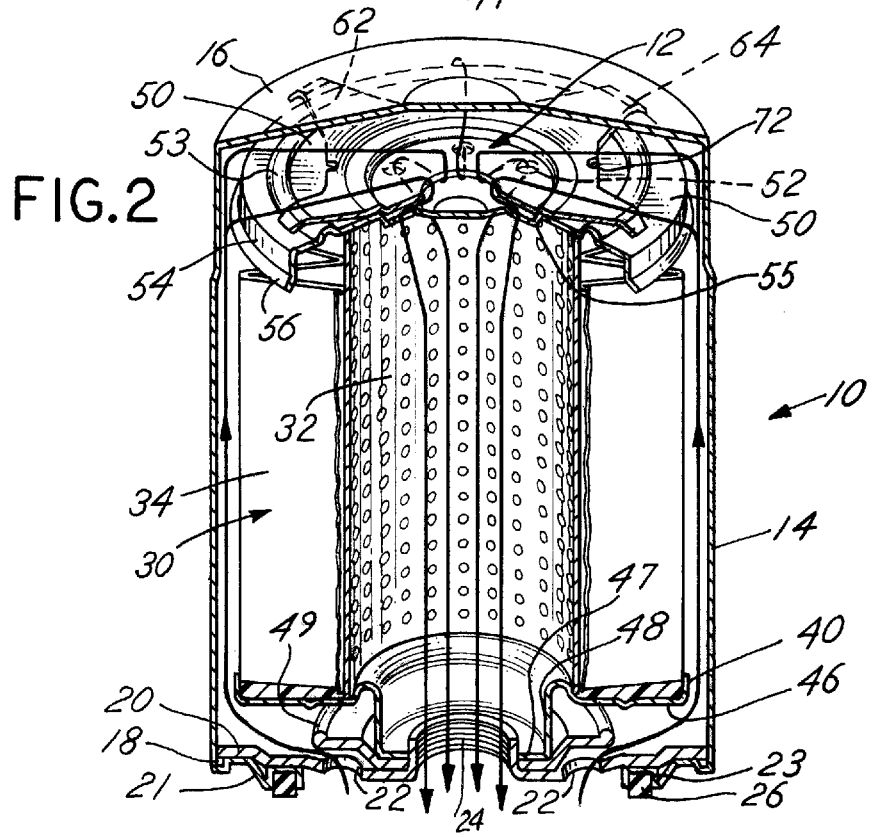

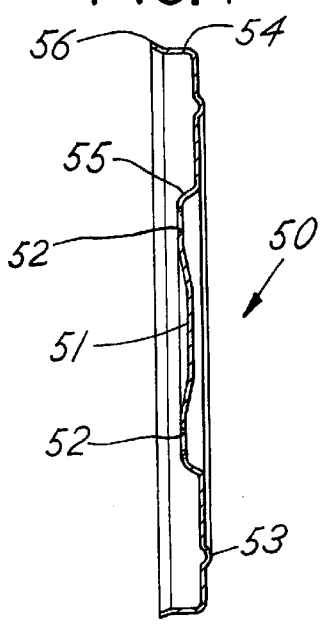
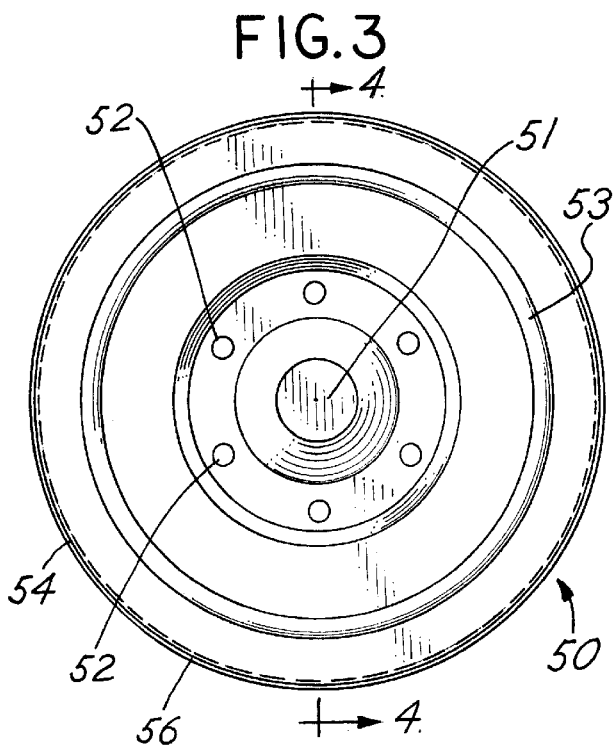
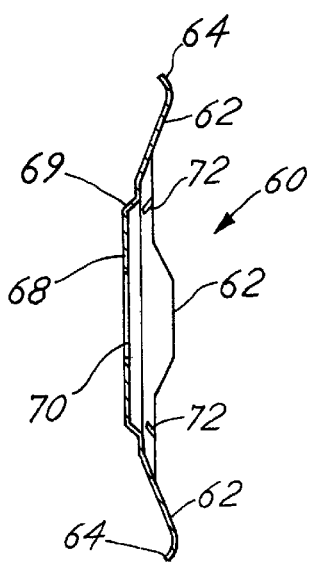
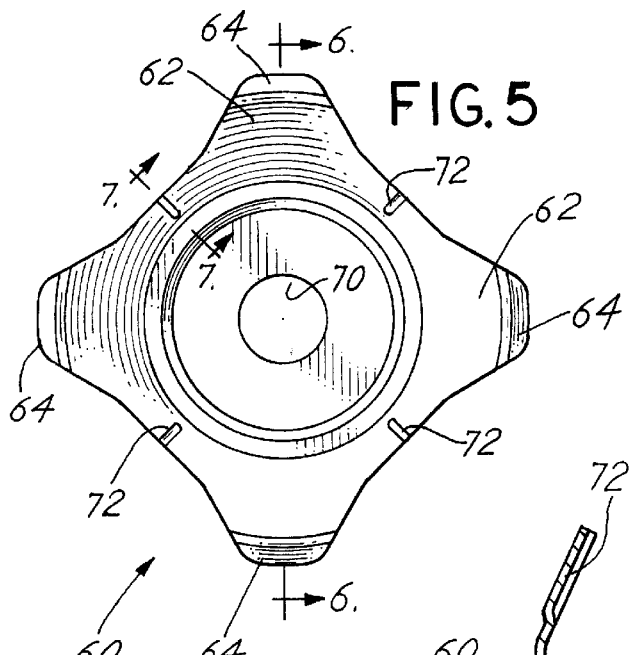
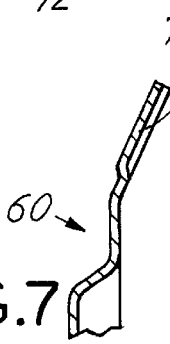

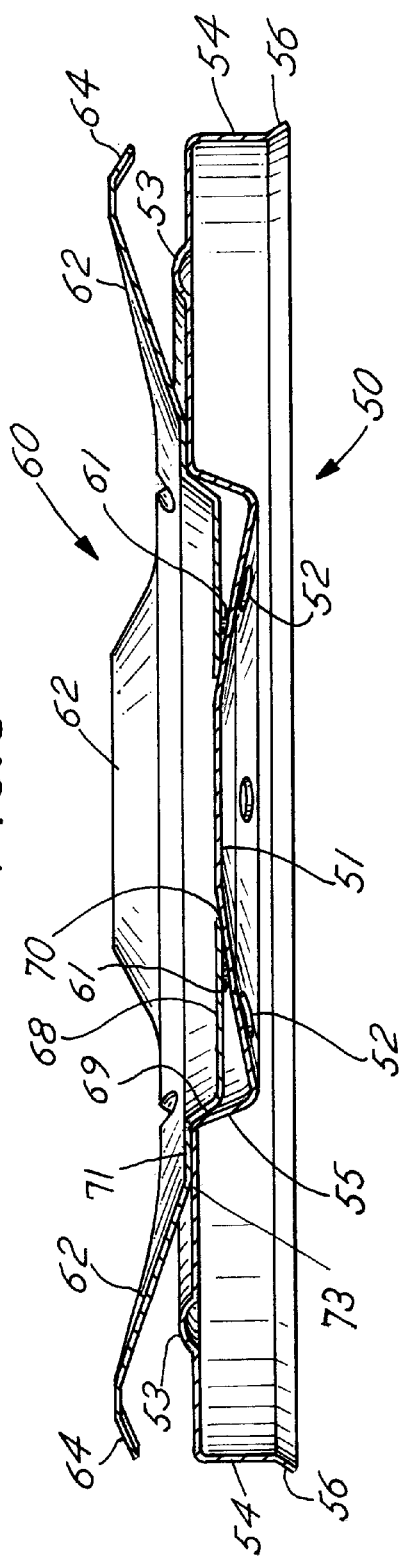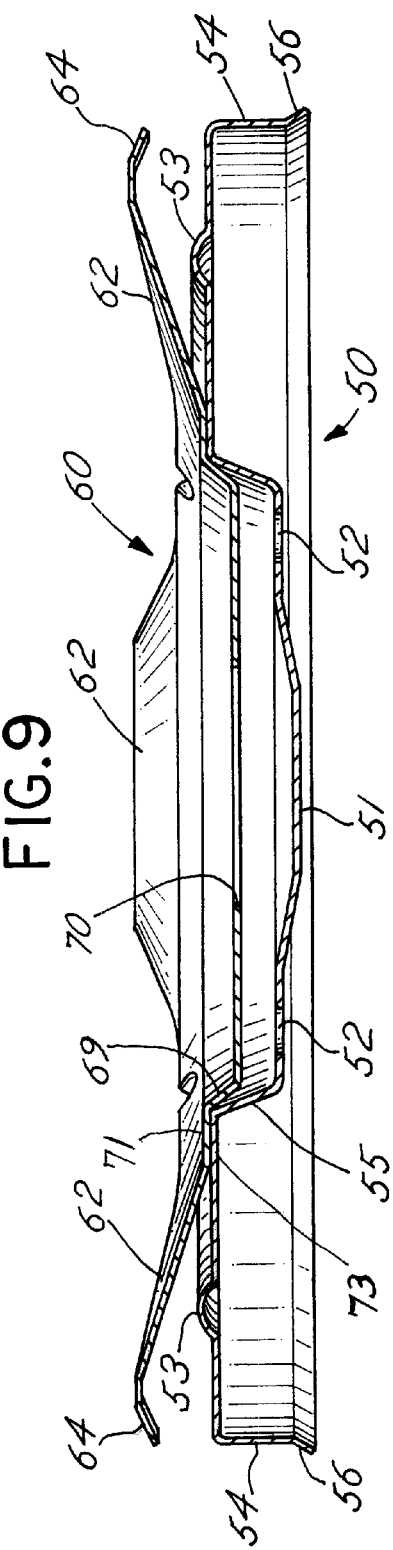

FILTER INCLUDING TEMPERATURE AND PRESSURE RESPONSIVE BYPASS

RELATED APPLICATION

The present application is a continuation-in-part of pending patent application Ser. No. 09/820,267 filed Mar. 28, 2001 and entitled "End Cap Relief Mechanism For A Filter".

BACKGROUND OF THE INVENTION

The present invention pertains to fluid filters and, more particularly, an end cap relief valve mechanism for a fluid filter.

Ordinarily, fluid filters, such as oil filters, are provided with relief valves in order to bypass the filter element in the event that the oil filter becomes clogged during use. The oil filter usually comprises a housing or shell having an open end closed by an end plate. The end plate usually contains one or more inlet openings and an outlet opening. Within the housing is an annular filter media pack. Normally, there is a valve comprised of a valve seat, a valve member and a spring for biasing the valve to the closed position disposed within the housing. The valve is commonly secured to the filter media pack.

Takahara U.S. Pat. No. 5,759,351 shows an oil filter having a plate spring for biasing a filter pack within a housing. When the filter pack becomes clogged, the pressure in the housing increases and the relief valve opens to keep the flow rate of the oil supplied to the engine. The filter pack does not include end caps and the relief valve of Takahara is structurally different from that of the applicant.

Sundhohn U.S. Pat. No. 5,019,251 discloses a filter having a relief valve mechanism with a spiral spring that is relatively bulky.

Cantoni U.S. Pat. No. 4,885,082 reveals an oil filter with a multi-component pressure relief valve having a bulky return spring. The prior art relief valves, as exemplified by those shown in the cited references, are constructed separate from the end cap, and proper positioning of the valve within the housing of the fluid filter was sometimes difficult and/or time consuming. The prior relief valves were relatively bulky and occupied considerable volume within the housing of the oil filter. Consideration was given to reducing the number of parts of the valve in order to reduce the cost and to enhance positioning of the valve and facilitate assembly of the fluid filter.

Further, when an engine is manufactured there are usually trace amounts of core sand and machining debris left within the engine from the manufacturing operation. The core sand and metal debris is very abrasive and must be removed as quickly as possible to prevent damage to the engine. This sand and debris can find its way into the engine oil. The engine oil needs to be cleaned prior to being pumped to various places in the engine. The oil filter should accomplish this cleaning operation and is usually successful in removing the sand and debris contaminants. Unfortunately, the first time the engine is started the oil filter bypass valve may open momentarily due to high differential pressure and the contaminants would not be filtered. If the initial bypass valve opening could be delayed a higher percentage of the contaminants could be removed.

An object of the present invention is to provide an improved fluid filter having a relief valve mechanism formed in part by an end cap, which overcomes difficulties and disadvantages of prior fluid filters.

Another object of the present invention is to provide an improved fluid filter that incorporates a relief valve mechanism as a part of an end cap to provide a relief valve mechanism that is compact, has a low profile and is less costly than prior relief valve mechanisms, thus allowing the fluid filter to be shorter, yet have the same filtration and flow characteristics as prior taller fluid filters, and which is capable of removing core sand and metal debris contaminants during initial operation of the engine with which the fluid filter is used.

Yet another object of the invention is to provide an improved fluid filter having a housing that incorporates an end cap and a spring that are operationally interengaged for controlling fluid flow and provide a relatively flat profile, together with temperature responsive means for holding the end cap and spring interengaged until the fluid temperature in the housing reaches a predetermined temperature and pressure, at which time fluid flow is permitted, whereby contaminants are removed from the fluid during initial operation of the engine with which the fluid filter is used.

Other objects and advantages of the present invention will be made more apparent in the description which follows.

SUMMARY OF THE INVENTION

A fluid filter, for example, an oil filter comprises a housing that is open at one end and closed at the other end by an end plate. The end plate has at least one inlet opening and one outlet opening therein. Filter media is disposed in the housing. An end cap is provided at each end of the filter media. An anti-drain back valve, disposed between the end plate and an end cap of the filter media adjacent the end plate, cooperates with the inlet opening to prevent the back flow of oil there through in use. The end cap remote from the end plate has at least one opening in the central portion thereof. A spring cooperates with the end cap remote from the end plate to close the opening in the end cap to fluid flow and is responsive to the pressure within the housing to open the flow path when the differential oil pressure in the housing exceeds a predetermined value. The end cap remote from the end plate and the spring comprise a relief valve mechanism. The spring also functions to load the filter media and to retain the anti-drain back valve in position between the end cap adjacent the end plate and the end plate. The spring is provided with spaced projections which maintain a flow path should the spring be flattened against the interior of the housing and thereby permit flow of oil around the spring to permit desired operation of the relief valve mechanism. The spring and the end cap remote from the end plate are constructed and arranged to provide an end cap relief valve mechanism that has a flat profile and occupies little more space than the end cap alone. A temperature responsive means is provided between the end cap and the spring to hold the parts until a predetermined temperature of oil is attained. Thereafter the end cap and the spring can operate to control oil flow responsive to a pressure differential across the end cap.

BRIEF DESCRIPTION OF THE DRAWINGS

There is shown in the attached drawing a presently preferred embodiment of the invention, wherein like numerals in the various views refer to like elements and wherein, FIG. 1 is a schematic perspective view, partially broken away, of a fluid filter embodying the end cap relief valve mechanism of the present invention, with the end cap valve mechanism being shown in the closed position;

FIG. 2 is a schematic perspective view, partially broken away, similar to FIG. 1, of a fluid filter embodying the end cap relief valve mechanism of the present invention, with the end cap relief valve mechanism being shown in the open position;

FIG. 3 is a plan view of the end cap of the end cap relief valve mechanism;

FIG. 4 is a cross-section of the end cap taken along the line 4—4 of FIG. 3;

FIG. 5 is a plan view of the spring of the end cap relief valve mechanism;

FIG. 6 is a cross-section of the spring taken along the line 6—6 of FIG. 5;

FIG. 7 is a detail cross-section taken generally along the line 7—7 of FIG. 5;

FIG. 8 is a cross-section showing the relationship of the end cap and the spring of the end cap relief valve mechanism, with the end cap relief mechanism shown in the closed position; and FIG. 9 is a cross-section showing the relationship of the end cap and the spring of the end cap relief valve mechanism, with the end cap relief valve mechanism in the open position.

DETAILED DESCRIPTION OF THE INVENTION

There is shown in FIGS. 1 and 2 a schematic representation of a fluid filter 10 embodying the relief valve mechanism 12 of the present invention. The fluid filter 10, which can be an oil filter, includes a housing or shell 14 having a closed end 16 and an open end 18. The open end 18 of the housing 14 is closed by an end plate 20 that is provided with one or more inlet openings 22 disposed radially outwardly from the center axis of the fluid filter 10 and an outlet opening 24 disposed generally centrally of the end plate 20. The portion of the end plate 20 forming the outlet opening 24 is internally threaded so as to receive an externally threaded engagement member (not shown). Other connections may be used, as would be known to persons skilled in the art. The end plate 20 is suitably positioned and secured in the open end 20 of the housing 14. A cover or end ring 21 is secured to the housing 14 outwardly from the end plate 18 in a conventional manner, for example, by a double-rolled seam. The cover 21 has a circular recess 23 formed therein for receiving a sealing gasket 26.

Disposed within the housing 14 is a filter media pack 30 which comprises a central perforated core 32 having a suitable filter media 34 carried thereon. The core 32 is typically fabricated from relatively thin sheet metal, such as steel or aluminum, that is stamped to provide the openings in the core and is then coiled to form a cylinder of the desired diameter. The filter media 34 may comprise a conventional pleated paper or a wound filter media. Each end of the filter media 34 may be potted in a suitable adhesive or plastisol to help maintain the shape of the filter media during handling and in use. See, for example, the adhesive 29 at the lower end of the filter media 34. For purposes of better showing the top of the pleated filter media, no adhesive is shown at the upper end of the filter media 34 in FIGS. 1 and 2.

An end cap 40 closes the lower end of the filter media pack 30. The end cap 40 may be secured to the filter media 34 or it can be separate therefrom. The end cap 40 comprises a support member 46, which engages the lower end of the filter media 34 and a generally cylindrical portion 48 having a circular flange 47 at the lower end that engages the portion of the end plate 20 that forms the outlet opening 24. The flange 47 cooperates with the end plate 20 to help retain a resilient valve member 49 in place. The valve member 49, which may be made from a natural or an artificial rubber, functions to permit the entry of fluid through the inlet openings 22 into the housing 14, but to prevent the reverse flow of oil through the openings 22. The valve member 49 is sometimes referred to as an anti-drain back valve.

The relief valve mechanism 12 of the present invention includes a generally circular end cap 50, which is remote from the end plate 20, and extends over the top of the filter media pack 30 and engages the upper end thereof. The end cap 50 may be secured to the filter media 34 or it can be separate therefrom. The end cap 50 is imperforate except for one or more openings 52 spaced radially outwardly from the center thereof. The openings 52 are arranged in a circular pattern that is spaced radially outwardly from the center axis of the end cap 50. The end cap 50 includes a cylindrical peripheral rim 54 that has an outwardly flared flange 56 at the lower end thereof. Cooperating with the end cap 50 is a valve spring or plate spring 60 that performs multiple functions. First, the spring 60 abuts the interior of the housing 14 and loads or pushes the filter media pack 30 downwardly toward the end plate 20 so as to urge the lower end cap 40 downwardly against the anti-drain back valve 49 to retain the anti-drain back valve 49 in place. Second, the spring 60 cooperates with the end cap 50 to normally close the flow path through the openings 52 and in response to a predetermined pressure within the housing 14 to open the flow path through the openings 52, as will be more fully explained hereinafter.

Turning to FIGS. 3 and 4 there is better seen the end cap 50 of the present invention. The end cap 50 has a relatively flat profile. The central portion 51, which is imperforate except for the openings 52, is depressed from the top outer surface of the end cap 50. The openings 52 are shown as being circular, however, it will be understood by person skilled in the art that other configurations are possible within the scope of the invention. The openings 52 could be square, oval, or crescent shaped. Furthermore, the size of the openings 52 could be varied depending upon the specific design parameters for flow necessary with a particular fluid filter. The top surface of the end cap 50 is provided with a ridge or elevated circular portion 53 that will help stiffen or rigidify the end cap 50 in use.

With reference to FIGS. 5–7, there is better shown the spring 60 that controls the flow of fluid through the openings 52 in the end cap 50 and helps to retain the anti-drain back valve 49 in position between the lower end cap 40 and the end plate 20. The spring 60, as shown, is comprised essentially of a plate made, for example, from steel, formed to shape. The spring 60 includes four outwardly extending arm portions 62 that extend upwardly from the central portion 68. The ends 64 of the arm portions 62 are bent downwardly. The central portion 68 of the spring 60 is relatively flat and has an opening 70 in the center thereof, which is in alignment with the imperforate central portion 51 of the end cap 50. Provided in the spring 60 are depressions 72 which are intended to assure that a spacing remains between the interior of the housing 14 and the spring 60 and to provide a flow path should the spring 60 be flattened against the interior of the housing. This construction assures that there will be flow of oil over the top of the valve spring 60 so as to enable proper operation of the relief valve mechanism.

With reference to FIGS. 8 and 9, there is better shown the cooperation of the spring 60 and end cap 50 of the end cap relief valve mechanism 12. The spring 60 and the end cap 50 operationally interengage and provide a relatively flat profile. Initially, temperature responsive means 61 (FIG. 8) are provided at contact points or along the contact line between the spring 60 and the end cap 50 of the end cap relief valve mechanism 12. The temperature or thermal responsive means 61 may be an adhesive, for example, a hot melt adhesive, affixed at various places along the line of contact or along the entire line of contact. The adhesive will hold the end cap 50 and spring 60 together initially and will yield upon attainment of a predetermined oil temperature within the housing 14 to permit normal operation of the end cap 50 and spring 60.

By use of the temperature responsive means 61 the initial opening of the end cap relief valve mechanism 12 is delayed and more contaminants, e.g., core sand or metal debris can be removed from the oil during initial operation of the engine.

The overall height of the two components when assembled within a housing or shell 14 is little more than the height of the end cap 50. Seal means are provided between the end cap 50 and the spring 60 to prevent fluid from passing directly to the openings 52 and bypassing the opening 70 in the spring 60. In the embodiment shown, the flattened annular portion 71 radially outward of the annular portion 69 extending from the central portion 68 of the spring 60 engages the flattened radial portion 73 radially outward of the annular portion 55 extending from the central portion 51 of the end cap 50 to provide a seal for preventing fluid from passing between the end cap 50 and the spring 60 and bypassing the opening 70 in the spring 60. In the closed position shown in FIG. 8, the central portion 51 of the end cap 50 is positioned upwardly so as to close the opening 70 in the spring 60 and thus block the flow of fluid (oil) through the end cap relief valve mechanism 12. This is the normal position of the central portion 51. When the pressure within the housing 14 increases and the fluid pressure differential on the central portion 51 of the end cap 50 exceeds a predetermined value, the central portion 51 of the end cap 50 below the opening 70 in the spring 60 will flex downwardly, as shown in FIG. 9, to open a flow path through the end cap relief valve mechanism 12.

The operation of the fluid filter 10 will now be described. With reference to FIG. 1, the fluid filter 10 is connected to an engine in the normal manner. Initially, thermal or temperature responsive means 61 will hold the end cap 50 and spring 60 together as shown in FIG. 8. This would preclude fluid flow through the end cap relief valve mechanism 12. Thus, during initial operation of the engine upon which the fluid filter or oil filter 10 is used, the thermal responsive means or thermal sensitive means 61 would operate to delay opening of the end cap relief valve mechanism 12, even if there should be a pressure surge or high differential pressure. As the oil temperature increased in the housing 14, the temperature responsive means or temperature sensitive means 61 would yield at a predetermined temperature and permit the valve 60 and end cap 50 to move with respect to one another and permit fluid flow through the end cap relief valve mechanism 12. Thereafter, with the engine operating, oil to be cleaned will enter the housing 14 of the fluid filter 10 through the opening or openings 22 in the end plate 20. Oil will pass through the filter media pack 30 to be cleaned and through the openings in the core 32 of the filter media pack 30 for return through the outlet opening 24 to the engine for reuse. If in use, the filter media pack 30 becomes clogged with dirt and impurities removed from the oil, the pressure within the housing 14 will increase. As shown in FIG. 2 and in FIG. 9, when the pressure differential across the end cap exceeds a predetermined value, the central portion 51 of the end cap 50 will flex and separate from the spring 60 and permit oil to flow through the opening 70 in the spring 60 and the openings 52 in the end cap 50 and be returned to the engine. The bypass or return of oil to the engine in the event of a clogged or substantially clogged filter media pack 30 will prevent damage to the engine.

The end cap relief valve mechanism 12 of the present invention comprises basically two elements-an end cap and a spring that cooperates therewith. Since there are only two parts, parts costs and manufacturing costs are reduced. Parts costs are also reduced by making use of the end cap that is normally used with one end of a filter media pack. It will be understood that the end caps can be integral with the filter media or they can be separate from the filter media. Further, it will be understood that the end cap may comprise only the central portion 51 that cooperates with a spring 60 to perform the flow control function. In the preferred embodiment, the profile of the end cap relief valve mechanism 12 is relatively flat and occupies little space beyond that of the end cap. This allows the fluid filter of the present invention to be shorter than prior devices, yet have the same filtration and flow characteristics as such prior taller fluid filters. The spring 60 not only provides a portion of the relief valve but also a loading function to bias the filter media pack 34 and the end cap 40 toward the end plate 20 to retain the anti-drain back valve 49 in place between the end cap 40 and the end plate 20. It is possible to use a different spring, for example, a coil spring, however, some attributes of the preferred embodiment may be sacrificed.

The provision of a thermal responsive means or a thermal sensitive means between the end cap 50 and the valve 60 will delay fluid flow through the end cap relief valve mechanism 12 the first time the engine is started. Thus, more contaminants from the engine, such as core sand or metal debris, will be trapped in the filter media pack 30. Though an adhesive, such as a hot melt adhesive, is the preferred material at present, it is recognized that other materials that hold the end cap and the valve together initially and the yield at a predetermined oil temperature could be employed.

While we have shown a presently preferred embodiment to the present invention, it will be apparent to persons of ordinary skill in the art that the invention may be otherwise embodied within the scope of the appended claims.

We claim:

1. In a fluid filter comprising a housing that is open at one end, an end plate connected to said housing and closing said open end, said end plate having at least one inlet opening and an outlet opening therein, an annular filter media disposed in said housing, said filter media having a first end cap adjacent said end plate and a second end cap remote from said end plate, and a valve member for controlling flow of fluid through the inlet opening, the improvement comprising the second end cap having at least one opening in a central portion thereof and a spring cooperating with said second end cap and closing said at least one opening to fluid flow, the second end cap contacting the spring, and temperature sensitive means for holding the second end cap and the spring in contact until a predetermined temperature of the fluid is attained, the temperature sensitive means being responsive to the temperature within the housing for enabling the second end cap and the spring to separate and thereafter permitting opening of said at least one opening in response to pressure differential across the second end cap.

2. A fluid filter as in claim 1, wherein the second end cap has a plurality of openings in the central portion thereof spaced radially outwardly from the central axis of the second end cap and the spring controls the flow of fluid through said plurality of openings.

3. A fluid filter as in claim 1, wherein the valve member comprises an anti-drain back valve disposed between the first end cap and the end plate, said spring being constructed and arranged to engage the interior of the housing so as to load the filter media and the first end cap adjacent to the end plate to help retain the anti-drain back valve in place.

4. A fluid filter as in claim 1, wherein the temperature sensitive means comprises a hot melt adhesive disposed between the second end cap and the spring.

5. A fluid filter as in claim 2, wherein the central portion of the second end cap is capable of being flexed from a first position against the spring to a second position away from the spring.

6. A fluid filter as in claim 5, wherein the spring has a central opening therein, the central portion of the second end cap closing the central opening when in the first position and opening the central opening when flexed to the second position, whereby, the spring is normally in the first position closing flow of fluid and when the pressure within the housing increases and the differential pressure across the second end cap exceeds a predetermined value, the central portion of the second end cap is flexed to the second position to permit flow of fluid.

7. An oil filter comprising a housing that is open at one end, an end plate connected to said housing and closing said open end, said end plate having at least one inlet opening and an outlet opening therein, an anti-drain back valve for precluding return flow of oil through the inlet opening, an annular filter media disposed in said housing, said filter media having a first end cap adjacent said end plate and a second end cap remote from said end plate, the second end cap having at least one opening spaced radially outwardly from the central axis thereof and a spring valve cooperating with said second end cap for closing said at least one opening to fluid flow, whereby, in normal operation, when the pressure within the housing increases and the pressure differential across the second end cap exceeds a predetermined value, said at least one opening will be opened to permit fluid flow therethrough and including temperature responsive means between the second end cap and the spring valve for holding the second end cap and spring valve so as to preclude flow through said at least one opening in the second end cap, said temperature responsive means being released upon attainment of a predetermined temperature of the oil in the housing to permit separation of the second end cap and spring valve in response to the pressure differential across the end cap.

8. An oil filter as in claim 7, wherein the second end cap has a plurality of openings in a central portion thereof spaced radially outwardly from the central axis of the second end cap and the spring cooperates with the second end cap to control the flow of fluid through said plurality of openings.

9. An oil filter as in claim 8, wherein the anti-drain back valve is disposed between the first end cap and the end plate, said spring valve being constructed and arranged to engage the interior of the housing so as to load the filter media and the first end cap adjacent to the end plate to help retain the anti-drain back valve in place.

10. An oil filter as in claim 8, wherein the central portion of the second end cap is capable of being flexed from a first position against the spring valve to a second position away from the spring valve.

11. An oil filter as in claim 10, wherein the spring valve has a central opening therein, the central portion of the second end cap closing the central opening when in the first position and opening the central opening when flexed to the second position, whereby, the spring valve is normally in the first position closing the flow of oil such that oil entering the housing through the inlet opening in the end plate passes through the filter media to be cleaned and when the filter media becomes clogged, the pressure within the housing increases and when the pressure differential across the second end cap exceeds a predetermined value, the central portion of the second end cap is flexed to the second position to permit oil to bypass the filter media and flow from the inlet opening in the end plate, through the central opening in the spring and the plurality of openings in the end cap and out the outlet opening.

12. An oil filter as in claim 10, wherein the spring valve and the second end plate are constructed and arranged to operationally interengage and provide a flat profile.

13. An oil filter as in claim 7, including seal means between the second end cap and the spring valve to prevent oil from passing directly to the at least one opening in the second end cap and bypassing an opening in the spring valve.

14. An oil filter as in claim 7, wherein the temperature responsive means comprises an adhesive material.

15. An oil filter comprising a housing that is open at one end, an end plate connected to said housing and closing said open end, said end plate having at least one inlet opening and an outlet opening therein, an anti-drain back valve for precluding return flow of oil through the at least one inlet opening, an annular filter media disposed in said housing, said filter media having a first member at one end and an end cap at the other end, the first member having at least one opening spaced radially outwardly from the central axis thereof and valve means cooperating with said first member for closing said at least one opening to fluid flow, and temperature responsive means between the first member and the valve means for holding the first member and valve means so as to preclude flow of oil through said at least one opening in the first member, whereby, when the temperature of the oil reaches a predetermined temperature, the temperature responsive means will enable movement of the valve means with respect to the first member, and when the pressure within the housing increases and the pressure differential across the first member exceeds a predetermined value, said at least one opening will be opened to permit fluid flow therethrough.

16. An oil filter as in claim 15, wherein the first member and the valve means are sealingly engaged to one another radially outwardly of the at least one opening in the first member.

17. An oil filter as in claim 15 including seal means between the first member and the valve means to prevent oil from passing directly to the at least one opening in the first member and bypassing an opening in the valve means.

18. An oil filter as in claim 15, wherein the temperature responsive means is an adhesive.

19. An oil filter as in claim 15, wherein the temperature responsive means is a hot melt adhesive.

* * * * *